US011181060B2

(12) United States Patent
Riedle et al.

(10) Patent No.: US 11,181,060 B2
(45) Date of Patent: Nov. 23, 2021

(54) METHOD AND SYSTEM FOR POWER MATCHING DURING A DOWNSHIFT

(71) Applicant: Ford Global Technologies, LLC, Dearborn, MI (US)

(72) Inventors: Bradley Dean Riedle, Northville, MI (US); Kurt Howard Nickerson, Shelby Township, MI (US); Jianping Zhang, Ann Arbor, MI (US); Kendrick Morrison, Wayne, MI (US); David H. Schmitt, Livonia, MI (US); Markian Oleh Diakiw, Livonia, MI (US); Charles Suter, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 40 days.

(21) Appl. No.: 16/787,687

(22) Filed: Feb. 11, 2020

(65) Prior Publication Data

US 2021/0246844 A1    Aug. 12, 2021

(51) Int. Cl.
| | |
|---|---|
| *F02D 41/02* | (2006.01) |
| *B60W 10/06* | (2006.01) |
| *B60W 10/115* | (2012.01) |
| *F16H 61/02* | (2006.01) |
| *F16H 61/00* | (2006.01) |

(52) U.S. Cl.
CPC .......... *F02D 41/023* (2013.01); *B60W 10/06* (2013.01); *B60W 10/115* (2013.01); *F16H 2061/0012* (2013.01); *F16H 2061/0087* (2013.01); *F16H 2061/0216* (2013.01)

(58) Field of Classification Search
CPC ...... B60W 10/06; B60W 10/08; B60W 10/11; B60W 10/115; B60W 20/10; B60W 20/15; B60W 30/188; B60W 30/19; B60W 2540/10; B60W 2540/103; B60W 2710/0677; B60W 2710/086; F02D 41/023; F16H 2061/0012; F16H 2061/0087; F16H 2061/0216
See application file for complete search history.

(56) References Cited

U.S. PATENT DOCUMENTS 4,964,318 A * 10/1990 Ganoung .............. F02D 41/005
477/110
5,101,687 A    4/1992 Iwatsuki et al.
5,213,012 A *  5/1993 Suzuki .............. F16H 61/66259
477/48

(Continued)

FOREIGN PATENT DOCUMENTS

CN        102381308 A      3/2012
DE     102017112643 A1    12/2017
(Continued)

*Primary Examiner* — Edwin A Young
(74) *Attorney, Agent, or Firm* — Vincent Mastrogiacomo; McCoy Russell LLP

(57) ABSTRACT

A method for downshifting a vehicle having an automatic transmission is described. In one example, the method determines whether or not conditions are met for a power matching downshift. If conditions are met for a power matching downshift, output power of a powertrain propulsion torque source at an end of the power matching downshift is adjusted to an output power of the powertrain propulsion torque source at the beginning of the power matching downshift plus an offset power.

20 Claims, 4 Drawing Sheets

(56) References Cited

U.S. PATENT DOCUMENTS

| | | |
|---|---|---|
| 6,881,171 B2 | 4/2005 | Kuhstrebe et al. |
| 7,713,167 B2 | 5/2010 | Yamamoto et al. |
| 10,161,510 B2 | 12/2018 | Ota et al. |
| 2001/0008192 A1* | 7/2001 | Morisawa ............. B60W 10/08 180/197 |
| 2008/0058152 A1* | 3/2008 | Ortmann ................. B60K 6/52 477/3 |
| 2018/0194355 A1* | 7/2018 | Tsuda ....................... B60K 6/48 |
| 2018/0312156 A1* | 11/2018 | Yoon ..................... B60W 20/15 |

FOREIGN PATENT DOCUMENTS

| | | |
|---|---|---|
| EP | 0709599 A2 | 5/1996 |
| JP | 2913960 B2 | 6/1999 |
| JP | 6141683 B2 | 6/2017 |
| KR | 20170119609 A | 10/2017 |

\* cited by examiner

METHOD AND SYSTEM FOR POWER MATCHING DURING A DOWNSHIFT

FIELD

The present description relates to systems and method for downshifting a transmission when driver demand torque is gradually increasing. The system and methods may improve transmission shift feel by controlling powertrain torque in a way that may be preferred by drivers.

BACKGROUND AND SUMMARY

An automatic transmission of a vehicle may be downshifted from time to time. It may be desirable to provide consistent and repeatable downshifts so that a desired level of vehicle drivability may be provided.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
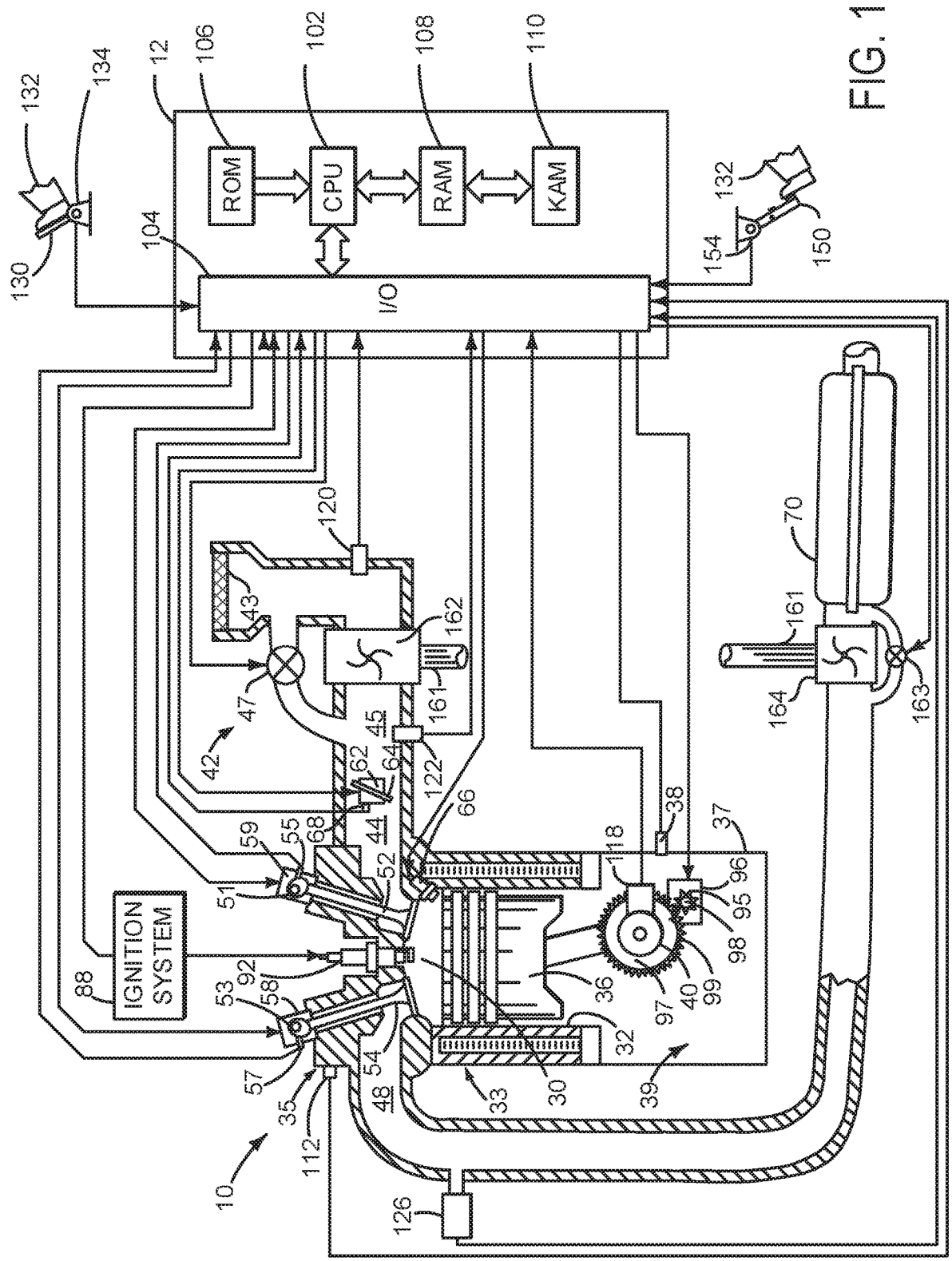
FIG. 1 shows a schematic diagram of an internal combustion engine.

The present description is related to matching vehicle torque when a vehicle transmission is downshifted during power on conditions (e.g., while an accelerator pedal is being applied). The power on conditions may include while accelerator pedal position is increasing. It may be desirable to match vehicle torque through a vehicle transmission downshift to improve vehicle drivability. In particular, it may be desirable to avoid torque holes or reductions in driveline torque output. In addition, it may be desirable to avoid conditions where driveline torque output after a transmission gear shift is increased at a rapid rate to match driver demand torque. The method described in the present description may be applied to the engine shown in FIG. 1 and the driveline shown FIG. 2 as well as other drivelines that include step ratio transmissions. The method of FIG. 4 may operate a driveline according to the sequence shown in FIG. 3.

A transmission of a vehicle may be downshifted when vehicle speed is being reduced or when engine speed can be increased to increase engine output power while driver demand torque is increasing. The downshift may include shifting to a next lower gear or skipping gears and shifting to a gear that is several gears lower than the presently engaged gear. If the engine reaches a maximum torque output before the downshift is commanded, torque that is delivered by the powertrain may be perceived to be under delivered. In addition, if powertrain torque increases significantly after the downshift completes, powertrain torque may be perceived to be over delivered. The powertrain torque delivery may be affected by torque multiplication resulting from engaging a lower gear and from an engine torque capacity increase that may be provided when engine speed is increased as a result of the downshift. Therefore, it may be desirable to provide a way of delivering consistent gradually increasing torque during a power on downshift.

The inventors herein have recognized the above-mentioned issues and have developed a vehicle operating method, comprising: reducing torque of a powertrain propulsion torque source during a transmission gear downshift; and adjusting power of the powertrain propulsion torque source at an end of the transmission gear downshift to an offset power plus an engine power output generated at a beginning of the transmission gear downshift.

By adjusting a power output of a vehicle propulsion torque source at an end of a downshift to power output at the beginning of the downshift plus an offset power, it may be possible to provide the technical result of providing a driveline torque progression during a power on downshift that meets driver expectations. In particular, the driveline torque may increase without saturating during a power on downshift. In addition, the driveline torque may increase at a rate that may be expected by a human driver. Consequently, vehicle drivability may be improved.

The present description may provide several advantages. In particular, the approach may provide predictable and consistent driveline power during a power on downshift. In addition, the approach may reduce a possibility of driveline torque exceeding driver expectations. Further, the approach may be applicable to a variety of downshift conditions including different vehicle speeds and propulsion torque source speeds.

The above advantages and other advantages, and features of the present description will be readily apparent from the following Detailed Description when taken alone or in connection with the accompanying drawings.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 20 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. A lift amount and/or a phase or position of intake valve 52 may be adjusted relative to a position of crankshaft 40 via valve adjustment device 59. A lift amount and/or a phase or position of exhaust valve 54 may be adjusted relative to a position of crankshaft 40 via valve adjustment device 58.

Valve adjustment devices 58 and 59 may be electro-mechanical devices, hydraulic devices, or mechanical devices.

Engine 10 includes a crankcase 39 that houses crankshaft 40. Oil pan 37 may form a lower boundary of crankcase 39 and engine block 33 and piston 36 may constitute an upper boundary of crankcase 39. Crankcase 39 may include a crankcase ventilation valve (not shown) that may vent gases to combustion chamber 30 via intake manifold 44. A temperature of oil in crankcase 39 may be sensed via temperature sensor 38.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: cylinder head temperature from temperature sensor 112 coupled to cylinder head 35; a position sensor 134 coupled to an accelerator pedal 130 for sensing force applied by human foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
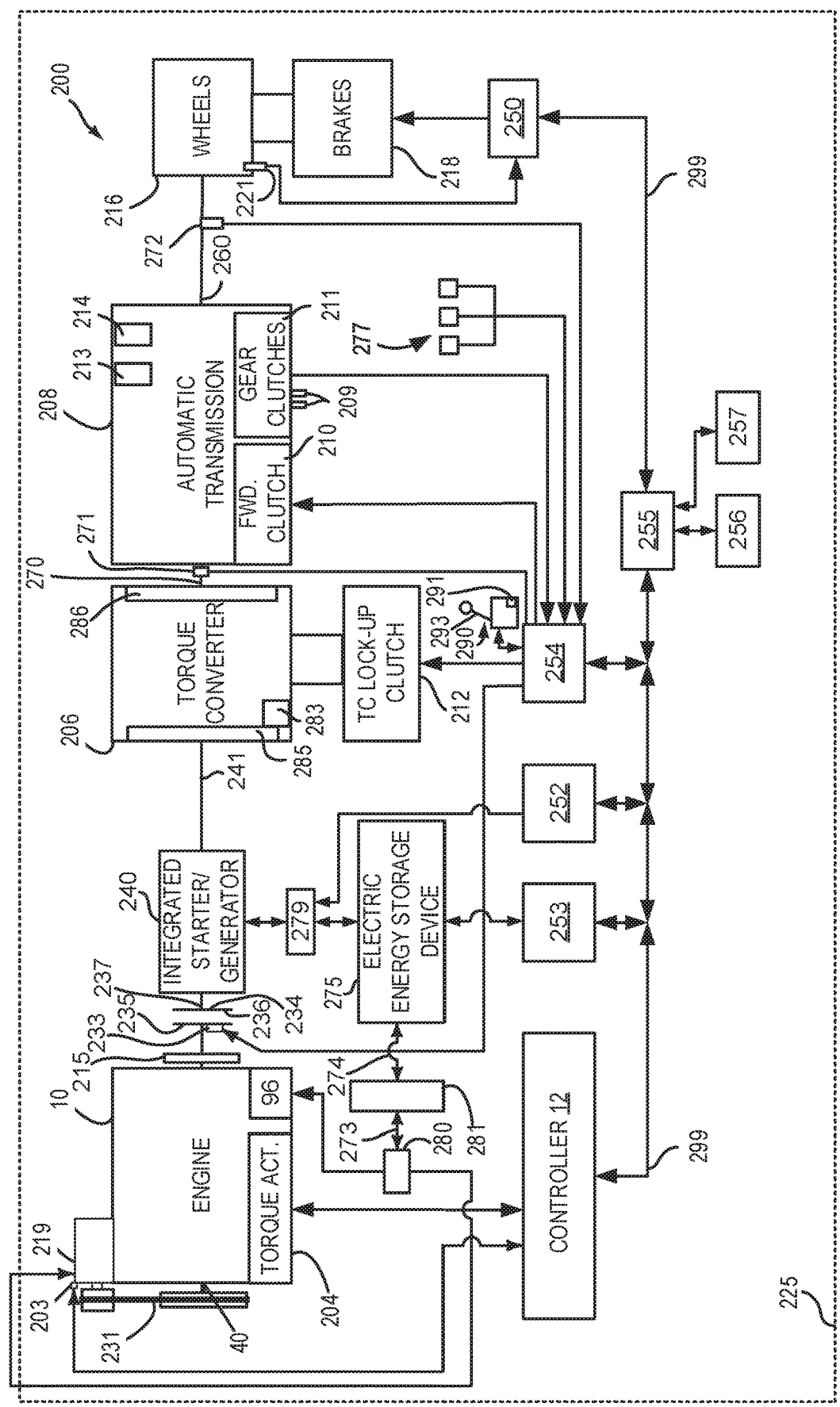
FIG. 2 shows a schematic diagram of an example vehicle driveline or powertrain including the internal combustion engine shown in FIG. 1.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 212, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

Vehicle controller 255 and/or engine controller 12 may also receive input from human/machine interface 256 and traffic conditions (e.g., traffic signal status, distance to objects, etc.) from sensors 257 (e.g., cameras, LIDAR, RADAR, etc.). In one example, human/machine interface 256 may be a touch input display panel. Alternatively, human/machine interface 256 may be a key switch or other known type of human/machine interface. Human/machine interface 256 may receive requests from a user. For example, a user may request an engine stop or start via human/machine interface 256. Additionally, human/machine interface 256 may display status messages and engine data that may be received from controller 255.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via belt integrated starter/generator BIS G 219, or via driveline integrated starter/generator (ISG) 240 also known as an integrated starter/generator. A temperature of BISG windings may be determined via BISG winding temperature sensor 203. Driveline ISG 240 (e.g., high voltage (operated with greater than 30 volts) electrical machine) may also be referred to as an electric machine, motor, and/or generator. Further, power of engine 10 may be adjusted via torque actuator 204, such as a fuel injector, throttle, etc.

BISG 219 is mechanically coupled to engine 10 via belt 231 and BISG 219 may be referred to as an electric machine, motor, or generator. BISG 219 may be coupled to crankshaft 40 or a camshaft (e.g., 51 or 53 of FIG. 1). BISG 219 may operate as a motor when supplied with electrical power via low voltage bus 273 and/or low voltage battery 280. BISG 219 may operate as a generator supplying electrical power to low voltage battery 280 and/or low voltage bus 273. Bi-directional DC/DC converter 281 may transfer electrical energy from a high voltage buss 274 to a low voltage buss 273 or vice-versa. Low voltage battery 280 is electrically directly coupled to low voltage buss 273. Low voltage bus 273 may be comprised of one or more electrical conductors. Electric energy storage device 275 is electrically coupled to high voltage buss 274. Low voltage battery 280 may selectively supply electrical energy to starter motor 96 and/or BISG 219.

An engine output power may be transmitted to a first or upstream side of powertrain disconnect clutch 235 through dual mass flywheel 215. Disconnect clutch 236 is hydraulically actuated and hydraulic pressure within driveline disconnect clutch 236 (driveline disconnect clutch pressure) may be adjusted via electrically operated valve 233. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 275 in a regeneration mode. ISG 240 is in electrical communication with energy storage device 275 via inverter 279. Inverter 279 may convert direct current (DC) electric power from electric energy storage device 275 into alternating current (AC) electric power for operating ISG 240. Alternatively, inverter 279 may convert AC power from ISG 240 into DC power for storing in electric energy storage device 275. Inverter 279 may be controlled via electric machine controller 252. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC 212 is locked. TCC 212 is electrically operated by controller 254. Alternatively, TCC may be hydraulically locked. In one example, the torque converter 206 may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling power multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power that is directly delivered to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches 211 and forward clutch 210 for selectively engaging and disengaging forward gears 213 (e.g., gears 1-10) and reverse gear 214. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand power or power request from an accelerator pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG 240 as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-X (where X is an upper gear number), D (drive), neutral (N), and P (park). Shift selector 290 shift lever 293 may be prevented from moving via a solenoid actuator 291 that selectively prevents shift lever 293 from moving from park or neutral into reverse or a forward gear position (e.g., drive).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

The system of FIGS. 1 and 2 provides for a vehicle system, comprising: an internal combustion engine; a transmission; an accelerator pedal; and a controller including executable instructions stored in non-transitory memory that cause the controller to downshift the transmission in response to a position of the accelerator pedal and vehicle speed and adjust power output of the internal combustion engine at an end of the downshift to a reference power plus and offset power. The vehicle system includes where the offset power is a function of a gear ratio change of the transmission gear downshift. The vehicle system further comprising, during the downshift, adjusting an amount of torque delivered to a transmission via the internal combustion engine to an amount of a transmission input torque modulation threshold. The vehicle system includes where the transmission input torque modulation threshold is reduced at a first time during the downshift and increased at a second time during the downshift, the second time after the first time. The vehicle system further comprises additional instructions to increase the amount of the transmission input torque modulation threshold to a maximum value at a third time. The vehicle system includes where the third time is the end of the downshift. The vehicle system further comprises additional instructions to adjust torque output of the internal combustion engine to provide a driver demand torque at a predetermined rate.

Figure 3:
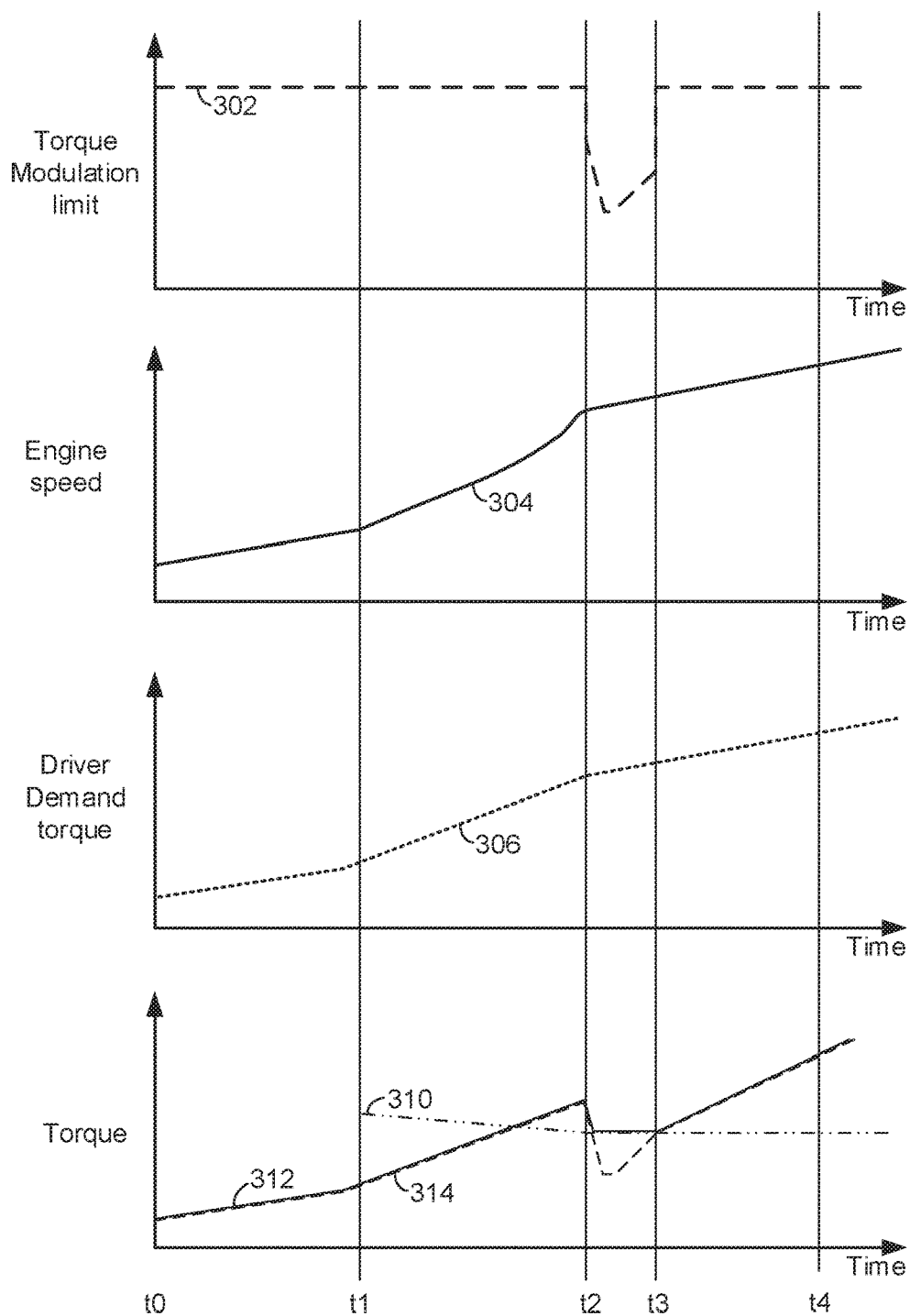
FIG. 3 shows an example power matching downshift sequence according to the method of FIG. 4.

Referring now to FIG. 3, plots of an example transmission downshift sequence is shown. The transmission downshifting sequence that is shown in FIG. 3 may be provided via the system of FIGS. 1 and 2 in cooperation with the method of FIG. 4. The vertical lines at times t0-t4 represent times of interest during the downshifting sequence. The four plots shown in FIG. 3 are aligned in time.

The first plot from the top of FIG. 3 is a plot of transmission input torque modulation threshold versus time. The vertical axis represents the level or value of the transmission input torque modulation threshold value and the transmission input torque modulation threshold value increases in the direction of the vertical axis arrow. The transmission input torque modulation threshold value is zero at the level of the horizontal axis. Transmission input torque that is delivered via powertrain propulsion torque sources (e.g., engine and/or electric machine) is constrained or limited to values that are less than the transmission input torque modulation threshold value. Thus, the transmission input torque modulation threshold is a maximum transmission input torque. Trace 302 represents the transmission input torque modulation threshold value. The horizontal axis represents time and time increases from the left side of the plot to the right side of the plot.

The second plot from the top of FIG. 3 is a plot of engine speed versus time. The vertical axis represents engine speed and the engine speed increases in the direction of the vertical axis arrow. Trace 304 represents the engine speed. The horizontal axis represents time and time increases from the left side of the plot to the right side of the plot.

The third plot from the top of FIG. 3 is a plot of an actual driver demand torque versus time. The vertical axis represents the actual driver demand torque and the actual driver demand torque increases in the direction of the vertical axis arrow. Line 306 represents the actual driver demand torque. The horizontal axis represents time and time increases from the left side of the plot to the right side of the plot. The actual driver demand torque may be determined via referencing or indexing a table or a function that outputs driver demand torque as a function of accelerator pedal position and vehicle speed.

The fourth plot from the top of FIG. 3 is a plot of torque versus time. The vertical axis represents torque and the amount of torque increases in the direction of the vertical axis arrow. Dash-dot-dot trace 310 represents a target driver demand torque for a power match downshift. Solid line trace 312 represents a modified driver demand torque. Dashed line trace 314 represents the actual engine or propulsion torque source torque. The horizontal axis represents time and time increases from the left side of the plot to the right side of the plot.

At time t0, the transmission input torque modulation threshold is at a higher level so that the transmission may accept a large input torque value. The engine speed is at a lower level and driver demand torque is low. The modified driver demand torque is equal to the actual driver demand torque. The target driver demand torque for a power match downshift is not present and engine or powertrain propulsion torque source torque is low and equal to actual driver demand torque.

Between time t0 and time t1, the transmission input torque modulation threshold remains constant and at a higher level so that the transmission may accept a large input torque value. The engine speed and the actual driver demand torque increase. The modified driver demand torque increases and the engine or propulsion torque source torque increase to match the actual driver demand torque. The target driver demand torque for the power match downshift is not present.

At time t1, the actual driver demand torque has risen to a level at which a power matched downshift is requested. The target driver demand torque for the power match downshift is now present and it is equal to the actual driver demand torque determined at time t1 plus an offset torque value. The modified driver demand torque continues to follow and be equal to the actual driver demand torque. The engine or propulsion torque source torque is equal to the actual driver demand torque. The off-going clutch (e.g., the clutch that holds the presently engaged transmission gear) may begin to be released (e.g., opened from a fully closed state) at time t1 (not shown).

Between time t1 and time t2, the transmission input torque modulation threshold is unchanged. The engine speed continues to increase and the actual driver demand torque continues to increase. The target driver demand torque for the power match downshift decreases a small amount since engine speed has increased and since it is based on a reference power that was determined at time t1. The modified driver demand torque continues to follow and be equal to the actual driver demand torque. The engine or propulsion torque source torque is equal to the actual driver demand torque. The off-going clutch may continue to be released.

At time t2, the transmission input torque modulation threshold is reduced significantly to reduce engine and/or propulsion torque source torque. The engine speed continues to increase and the actual driver demand torque continues to increase. The engine or propulsion torque source torque is reduced to the level of the transmission input torque modulation threshold to limit the amount of torque that is input to the transmission. The modified driver demand torque begins to be reduced and the target driver demand torque for the power match downshift levels off to a constant value. The off-going clutch may be fully released at time t2 and closing of the on-coming clutch (e.g., the clutch that controls torque flow to the gear that is being engaged or the new gear) may begin at time t2.

Between time t2 and time t3, the transmission input torque modulation threshold is reduced significantly and then it is increased as time t3 approaches. The engine speed continues to increase and the actual driver demand torque continues to increase. The engine or propulsion torque source torque is equal to and follows the transmission input torque modulation threshold. The modified driver demand torque is reduced to a level of the desired or target driver demand torque for the power match downshift. The target driver demand torque for the power match downshift has leveled off to a constant value that is slightly lower than its value at time t1.

At time t3, the transmission input torque modulation threshold is increased to a high level as the downshift completes. The engine speed continues to increase and the actual driver demand torque continues to increase. The target driver demand torque for the power match downshift remains unchanged. The engine torque or propulsion torque source torque is adjusted to follow the modified driver demand torque. The modified driver demand torque is less than the actual driver demand torque. However, the modified driver demand torque is gradually increased so that it matches the actual driver demand torque at time t4. The engine torque or propulsion torque source torque is equal to the modified driver demand torque between time t3 and time t4.

In this way, torque of the engine or propulsion torque source is adjusted during a shift so that is nearly the same as it was the onset of the downshift so that a torque "hole" or void may not be experienced by vehicle occupants. Thus, torque at the end of the shift is matched with torque at the beginning of the shift. In addition, engine or propulsion torque after the shift does not increase in an unexpected way. Instead, it gradually is merged with the actual driver demand torque so that the actual driver demand torque may be delivered.

Figure 4:
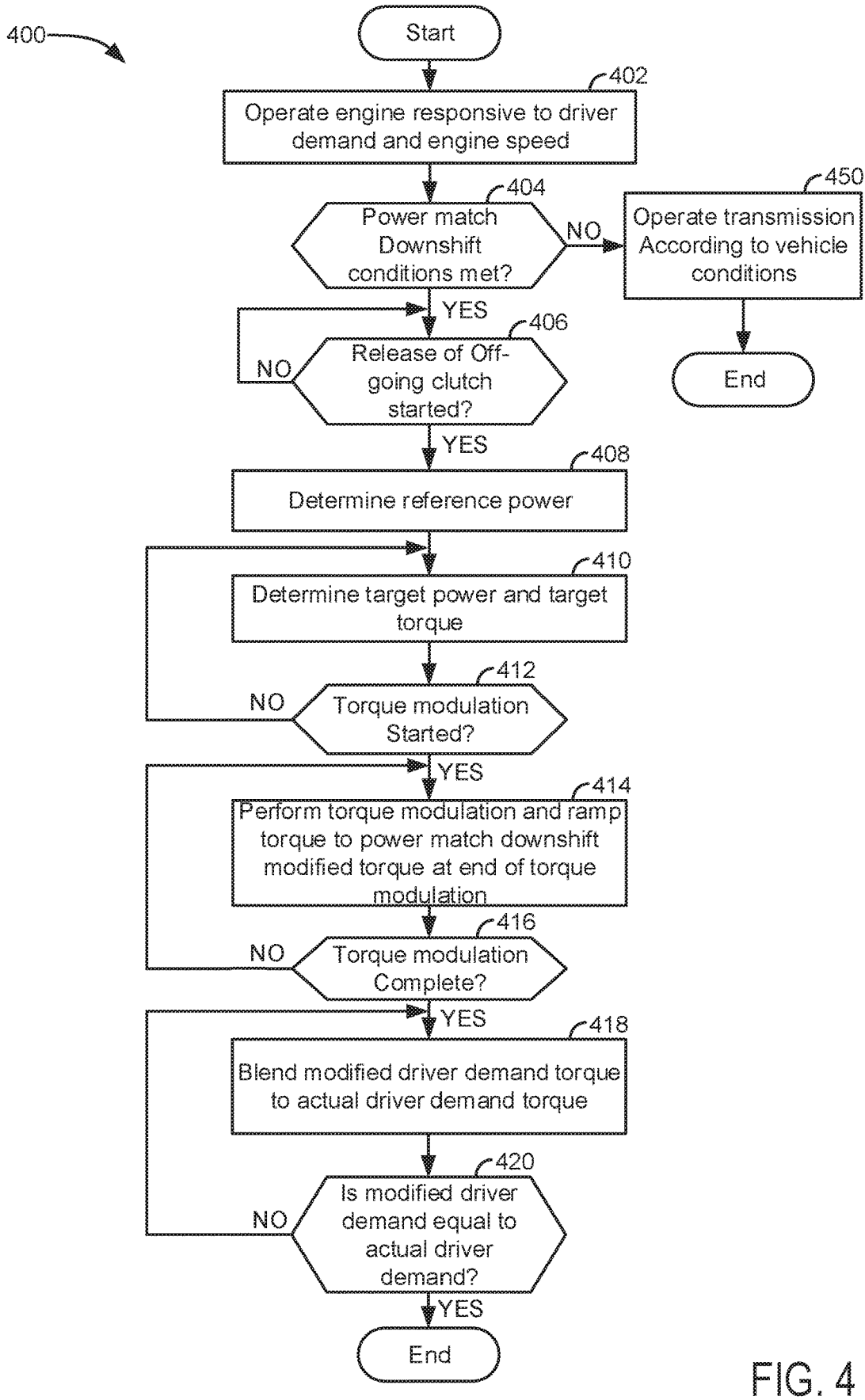
FIG. 4 shows a flowchart of an example method for downshifting a transmission.

Referring now to FIG. 4, a method for operating a driveline or powertrain is shown. The method of FIG. 4 describes a sequence for a power on downshift where power matching is applied during the downshift. The power on condition refers to the procedure occurring when an accelerator pedal is applied by a human driver. At least portions of method 400 may be implemented as executable controller instructions stored in non-transitory memory. Method 400 may operate in cooperation with the system of FIGS. 1 and 2. Additionally, portions of method 400 may be actions taken in the physical world to transform an operating state of an actuator or device. The method of FIG. 4 may be incorporated into the system of FIGS. 1 and 2 as executable instructions stored in non-transitory memory.

At 402, method 400 operates driveline or powertrain propulsion torque sources (e.g., engine 10 and ISG 240) according to actual driver demand torque an engine or ISG speed. For example, if a human driver applies the accelerator pedal and requests 200 Newton-meters (Nm) of torque when vehicle speed is 30 kilometers/hr, engine torque and ISG torque may be adjusted to deliver the driver demand torque value of 200 Nm. The engine torque may be adjusted via a torque actuator (e.g., throttle, fuel injector, etc.). The ISG torque may be adjusted via adjusting an amount of electrical current that is delivered to the ISG. In one example, the actual driver demand torque may be determined via accelerator pedal position and vehicle speed. Specifically, present accelerator pedal position and vehicle speed reference a table or function and the table or function outputs an empirically determined value of driver demand torque that is the actual driver demand torque. Values in the table or function may be determined via adjusting propulsion torque source torque as a function of accelerator pedal position. Method 400 proceeds to 404.

At 404, method 404 judges if conditions are present to provide a power matching downshift. In one example, method 400 may judge that conditions are present for a power matching downshift if driver demand torque is non-zero and less than a threshold torque, powertrain propulsion torque source speed is less than a threshold speed, and the accelerator pedal position rate of change is less than a threshold rate of change. If method 400 judges that driver demand torque is less than the threshold torque, powertrain propulsion torque source speed is less than the threshold speed, and the accelerator pedal position rate of change is less than the threshold rate of change, the answer is yes and method 400 proceeds to 406. Otherwise, the answer is no and method 400 proceeds to 450.

At 450, method 400 operates the transmission according to vehicle conditions. For example, method 400 may shift the transmission according to predetermined shift schedules. In one example, the shift schedules may adjust which gear of the transmission is engaged based on actual driver demand torque and vehicle speed. The transmission may upshift (e.g., shift from $1^{st}$ gear to $2^{nd}$ gear) or downshift (e.g., shift from $5^{th}$ gear to $2^{nd}$ gear) according to the shift schedule and actual driver demand torque. Method 400 proceeds to exit.

At 406, method 400 judges if a power matching downshift has started. In one example, the power matching downshift may be determined to have started when the off-going gear clutch begins to be released. In another example, method 400 may judge that the power matching downshift has started as soon as an on-coming clutch has reached a stroke position (e.g., a position immediately before the on-coming clutch begins to transfer torque). If method 400 judges that the power matching downshift has started, the answer is yes and method 400 proceeds to 408. Otherwise, the answer is no and method 400 returns to 406.

At 408, method 400 determines a reference power that is output by the vehicle propulsion torque source or sources. The reference propulsion torque source power may be determined via the following equation:

$$\text{Ref}P_{power} = P_{speed} \cdot P_{torque} \tag{1}$$

where $\text{Ref}P_{power}$ is the reference power value, $P_{speed}$ is the propulsion torque source speed, and $P_{torque}$ is the propulsion torque source torque. The propulsion torque source speed may be determined via an engine speed sensor or an electric machine speed sensor. The propulsion torque source torque may be estimated based on engine air flow, spark timing, and engine air-fuel ratio. Alternatively, the propulsion torque source torque may be estimated via an amount of electric current that is supplied to the ISG 240. Method 400 proceeds to 410.

At 410, method 400 determines a target driver demand power and a target driver demand torque for the vehicle propulsion torque source or sources. The target driver demand power amount may be determined via the following equation:

$$\text{Tar\_power} = \text{Ref}P_{power} + P_{offset} \tag{2}$$

where Tar_power is the target driver demand power that is the requested to be output from the driveline propulsion torque source or sources, $\text{Ref}P_{power}$ is the reference power, and $P_{offset}$ is an offset amount of power. In one example, the $P_{offset}$ value may be determined via indexing or referencing a table or function. The table or function may be referenced via a rate of engine speed or propulsion torque source speed change and a rate of change in accelerator pedal position. The table or function may output torque values that are smaller for smaller propulsion torque source speed changes and smaller accelerator pedal position changes. The table or function may output torque values that are larger for larger propulsion torque source speed changes and larger accelerator pedal position changes. The requested or target driver demand torque may be determined via the following equation:

$$\text{Tar\_Tor} = \frac{\text{Req\_power}}{P_{speed}}$$

where Tar_Tor is the target driver demand propulsion torque source torque, Req_power is the requested or target driver demand propulsion torque source power, and Pspeed is the propulsion torque source speed.

Method 400 may also determine a modified driver demand torque at 410. The modified driver demand torque at 410 is made equal to the actual driver demand torque as determined from accelerator pedal position and vehicle speed. The propulsion torque source torque (e.g., torque output of engine 10 and electric machine 240) is adjusted to the modified driver demand torque. Method 400 proceeds to 412 after determining the target driver demand propulsion torque source power and the target driver demand propulsion torque source torque. Method 400 proceeds to 412.

At 412, method 400 judges whether or not torque modulation has commenced in the present downshift. In one example, torque modulation commences when the transmission input torque modulation threshold is reduced for a first time during the present downshift. Alternatively, method 400 may judge that torque modulation has commenced in the present downshift when the modified driver demand torque is reduced to a value that is less than the actual driver demand torque as determined from accelerator pedal position and vehicle speed. If method 400 judges that torque modulation has commenced, the answer is yes and method 400 proceeds to 414. Otherwise, the answer is no and method 400 returns to 410.

Alternatively, method 400 may judge whether or not the on-coming clutch begins to close during the downshift. If method 400 judges that the on-coming clutch has begun to close, the answer is yes and method 400 proceeds to 414. Otherwise, the answer is no and method 400 returns to 410.

At 414, method 400 performs the requested torque modulation by adjusting the propulsion torque source torque to a level of a transmission input torque modulation threshold (e.g., see engine torque between time t2 and time t3 in FIG. 3). Method 400 also adjusts the modified driver demand torque to the target driver demand torque. The actual driver demand torque remains based on accelerator pedal position and vehicle speed.

When torque modulation ends (e.g., when the transmission input torque modulation threshold torque is increased and no longer equal to the propulsion torque source torque output), method 400 may ramp or gradually increase propulsion torque source torque to the modified driver demand torque. The modified driver demand torque is adjusted to the target driver demand torque. Alternatively, method 400 may ramp or gradually increase propulsion torque source torque to provide the modified driver demand torque when the on-coming clutch is fully closed (e.g., the transmission downshift is complete). Thus, ramping or gradually increasing the propulsion torque source torque to the modified driver demand torque may occur at an end of a power matching downshift. In this way, the propulsion torque source torque may be adjusted to a level at the end of the downshift that is based on propulsion torque source power at the beginning of the downshift to improve shift feel. Accordingly, the power that is input to the transmission at the beginning of the downshift may be matched with a power that is input to the transmission at the end of the downshift. The power offset that is added to the powertrain propulsion torque source may be provided to generate a feeling that wheel torque is increasing throughout the downshift. This feeling may improver driver satisfaction. The actual driver demand torque continues to be based on accelerator pedal position and vehicle speed. Method 400 proceeds to 416.

At 416, method 400 judges if torque modulation is complete. Torque modulation may be judged to be complete when the actual propulsion torque source torque is less than the transmission input torque modulation threshold. Alternatively, method 400 may judge if the on-coming clutch is fully closed. If so, method 400 proceeds to 418. Otherwise, method 400 returns to 414.

At 418, method 400 ramps (e.g. gradually increases at a predetermined rate) the propulsion torque source output torque and the modified driver demand torque to match the actual driver demand torque. Thus, the modified driver demand torque and the propulsion torque source output torque may be increased to the level of the actual driver demand torque. Method 400 proceeds to 420.

At 420, method 400 judges whether or not the modified driver demand torque is equal to the actual driver demand. If so, the answer is yes and method 400 proceeds to exit. Otherwise, the answer is no and method 400 returns to 418.

In this way, torque delivered via one or more propulsion torque sources may be adjusted during a downshift to smooth gear shifting. A modified driver demand torque may be generated without disturbing the actual driver demand torque so that torque may be controlled near an end of a downshift in a way that may reduce the possibility of driveline torque disturbances.

Thus, the method of FIG. 4 provides for a vehicle operating method, comprising: reducing torque of a powertrain propulsion torque source during a transmission gear downshift; and adjusting power of the powertrain propulsion torque source at an end of the transmission gear downshift to an offset power plus an engine power output generated at a beginning of the transmission gear downshift. The method includes where the offset power is a function a gear ratio change of the transmission gear downshift. The method includes where the offset power is a function of an amount of an accelerator pedal position change between an accelerator pedal position at the beginning of the transmission gear downshift and accelerator pedal position at the end of the transmission gear downshift. The method includes where the offset power is a first value for accelerator pedal position changes less than a threshold, where the offset power is a second value for accelerator pedal position changes greater than the threshold, the second value greater than the first value. The method includes where the powertrain propulsion torque source is an internal combustion engine. The method further comprises a second powertrain propulsion torque source providing power to a vehicle powertrain immediately before the transmission gear downshift, where the second propulsion torque source is an electric machine. The method includes where the transmission gear downshift includes skipping one or more gears.

The method of FIG. 4 also provides for a vehicle operating method, comprising: reducing torque of an internal combustion engine in response to power matching downshift conditions being met; and adjusting power of the internal combustion engine to an offset power plus a power output of the internal combustion engine at a beginning of a power matching downshift in response to an end of torque modulation of the internal combustion engine during the power matching downshift. The method further comprises adjusting a modified driver demand torque to a torque corresponding to a torque at which the internal combustion engine generates the offset power plus the power output of the internal combustion engine at the beginning of the power matching downshift at a present speed of the internal combustion engine. The method further comprises adjusting the modified driver demand torque to a driver demand torque in response to the end of torque modulation of the internal combustion engine. The method further comprises adjusting torque output of the internal combustion engine to the modified driver demand torque in response to the end of torque modulation of the internal combustion engine. The method includes where adjusting power of the internal combustion engine includes adjusting at least one of a plurality of torque actuators. The method further comprises adjusting torque output of the internal combustion engine to a transmission torque limit threshold during a torque modulation phase of the power matching downshift.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle operating method, comprising:
    reducing torque of a powertrain propulsion torque source during a transmission gear downshift; and
    adjusting power of the powertrain propulsion torque source at an end of the transmission gear downshift to an offset power plus an engine power output generated at a beginning of the transmission gear downshift.

2. The method of claim 1, where the offset power is a function of a gear ratio change of the transmission gear downshift.

3. The method of claim 2, where the offset power is a function of an amount of an accelerator pedal position change between an accelerator pedal position at the beginning of the transmission gear downshift and accelerator pedal position at the end of the transmission gear downshift.

4. The method of claim 3, where the offset power is a first value for accelerator pedal position changes less than a threshold, where the offset power is a second value for accelerator pedal position changes greater than the threshold, the second value greater than the first value.

5. The method of claim 4, where the powertrain propulsion torque source is an internal combustion engine.

6. The method of claim 1, further comprising a second powertrain propulsion torque source providing power to a vehicle powertrain immediately before the transmission gear downshift, where the second propulsion torque source is an electric machine.

7. The method of claim 6, where the transmission gear downshift includes skipping one or more gears.

8. A vehicle system, comprising:
    an internal combustion engine;
    a transmission;
    an accelerator pedal; and
    a controller including executable instructions stored in non-transitory memory that cause the controller to downshift the transmission in response to a position of the accelerator pedal and vehicle speed and adjust power output of the internal combustion engine at an end of the downshift to a reference power plus an offset power.

9. The vehicle system of claim 8, where the offset power is a function of a gear ratio change of the transmission gear downshift.

10. The vehicle system of claim 8, further comprising, during the downshift, adjusting an amount of torque delivered to the transmission via the internal combustion engine to an amount of a transmission input torque modulation threshold.

11. The vehicle system of claim 10, where the transmission input torque modulation threshold is reduced at a first time during the downshift and increased at a second time during the downshift, the second time after the first time.

12. The vehicle system of claim 11, further comprising additional instructions to increase the amount of the transmission input torque modulation to a maximum value at a third time.

13. The vehicle system of claim 12, where the third time is the end of the downshift.

14. The vehicle system of claim 13 further comprising additional instructions to adjust torque output of the internal combustion engine to provide a driver demand torque at a predetermined rate.

15. A vehicle operating method, comprising:
    reducing torque of an internal combustion engine in response to power matching downshift conditions being met; and
    adjusting power of the internal combustion engine to an offset power plus a power output of the internal combustion engine at a beginning of a power matching downshift in response to an end of torque modulation of the internal combustion engine during the power matching downshift.

16. The method of claim 15, further comprising adjusting a modified driver demand torque to a torque corresponding to a torque at which the internal combustion engine generates the offset power plus the power output of the internal combustion engine at the beginning of the power matching downshift at a present speed of the internal combustion engine.

17. The method of claim 16, further comprising adjusting torque output of the internal combustion engine to the modified driver demand torque in response to the end of torque modulation of the internal combustion engine.

18. The method of claim 15, further comprising adjusting a modified driver demand torque to a driver demand torque in response to the end of torque modulation of the internal combustion engine.

19. The method of claim 18, where adjusting power of the internal combustion engine includes adjusting at least one of a plurality of torque actuators.

20. The method of claim 15, further comprising adjusting torque output of the internal combustion engine to a transmission torque limit threshold during a torque modulation phase of the power matching downshift.

* * * * *